United States Patent Office 3,745,198
Patented July 10, 1973

3,745,198
O-HALOVINYL PHOSPHOROTHIONATES
Samuel B. Soloway and Juan G. Morales, Modesto, Calif., assignors to Shell Oil Company, New York, N.Y.
No Drawing. Filed Oct. 9, 1970, Ser. No. 79,699
Int. Cl. C07f 9/08; A01n 9/36
U.S. Cl. 260—957                   9 Claims

ABSTRACT OF THE DISCLOSURE

Certain beta-halovinyl esters of phosphorothionic acids are useful as insecticides and as anthelmintics.

BACKGROUND OF THE INVENTION

This invention relates to beta-halovinyl esters of phosphorothionic acid. More particularly, this invention relates to beta-halovinyl esters of phosphorothionic acids which are useful as insecticides and as anthelmintics. Beta-halovinyl esters of phosphoric acid are a known class of insecticides (U.S. Pats. 2,956,073; 3,116,201; 3,299,190) that are also known to be useful as anthelmintics (U.S. Pats. 3,166,472, 3,318,769 and Canadian Pat. 731,113). Certain corresponding beta-chlorovinyl phosphorothionates are also known to be useful as insecticides. (See for example Seume et al., Toxicol. Appl. Pharmacol. 2 495, 1960; and U.S. Pat. 3,174,990.) Certain other beta-halovinyl phosphorothionates, however, have heretofore been unattainable by prior art methods.

Summary of the invention

This invention therefore is drawn to compounds of the formula

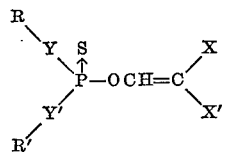

wherein R and R' can be the same or different and are selected from the group consisting of alkyl, aryl, aralkyl, alkenyl, alkynyl and alkoxyalkyl groups containing up to 12 carbon atoms, Y and Y' can be the same or different and are selected from the group consisting of O, S, NR and NH; X is a member selected from the group consisting of fluorine, chlorine, bromine and iodine and X' is a member selected from the group consisting of fluorine, chlorine, bromine, iodine and hydrogen.

Because of their availability, a preferred embodiment of the invention encompasses those compounds of the above formula wherein R and R' are alkyl, Y and Y' are O, X is chlorine and X' is chlorine or hydrogen.

The alkyl, alkenyl, alkynyl and alkoxyalkyl groups may be either straight or branched chained such as methyl, ethyl, propyl, isopropyl, butyl, sec-butyl, tert-butyl, octyl, decyl, dodecyl, vinyl, allyl, methallyl, butenyl, decenyl, undecenyl, methoxymethyl, methoxypropyl and the like. The aryl and aralkyl groups may be phenyl, naphthyl, benzyl, phenethyl and the like and may be substituted on the ring by substituents such as lower alkyl, halogen and nitro.

Especially preferred among the compounds above mentioned due to their activity and ease of preparation are those wherein R and R' can be the same or different and are alkyl of 1 to 8 carbon atoms; Y and Y' are both oxygen and X and X' are both chlorine.

All compounds coming within the scope of this invention are not uniformly active, some are active insecticides, while others are more active against endoparasites in warm blooded animals.

The compounds of this invention are prepared by means of a novel intermediate. This intermediate is prepared by reacting an halovinyl phosphorodichloridate with phosphorus pentasulfide to form the novel halovinyl phosphorodichloridothionate as claimed in Ser. No. 79,632, filed Oct. 9, 1970. The phosphorodichloridothionate is then reacted with an appropriate alcohol, thiol or amine to form the halovinyl phosphorothionates claimed herein.

As stated before, the compounds of this invention have not previously been available because of lack of a method of preparation. Various conventional methods, successful in the preparation of vinyl phosphates and certain phosphorothioates have been tried, but proved to be unsuccessful. For example, the classical Perkow reaction which is used to prepare vinyl phosphates did not yield the corresponding vinyl phosphorothionate. When a trialkyl phosphorothioite was reacted with chloral, the product was an O,S-dialkyl O-halovinyl phosphorothioate. Other conventional methods proved to be equally unsuccessful.

It has now been found that the compounds of the present invention can be prepared as outlined above. Starting phosphorodichloridate material is obtained by the treatment of 2,2-dichlorovinyl dimethyl phosphate with thionyl chloride in the presence of a catalyst such as dimethylformamide as described in Belgian Pat. 694,814.

The compounds of the present invention may be obtained by the reaction of the intermediate phosphorodichloridothionates with a compound of the formula RYH or R'Y'H or a metal salt thereof wherein the symbols R, R', Y and Y' have the same meanings previously given. This reaction is carried out in the presence of a non-protonic solvent, such as diglyme, tetrahydrofuran, benzene and diethyl ether. The reaction may be carried out, when Y or Y' is O or S, in the presence of a base such as a tertiary amine, i.e., triethylamine, or in the presence of sodium hydride. Alternatively, the reaction may be carried out in the presence of a metal salt of the appropriate alcohol or thiol, i.e., sodium methoxide, etc. When Y or Y' is NR or NH the reaction is preferably carried out in the presence of an excess of the amine reactant. For preparing symmetrical compounds, i.e., those wherein R and R' are the same and Y and Y' are the same, the reaction is carried out by reacting from 2 to about 2.2 molar equivalents of the reactant with the phosphorodichloridothioate. When an unsymmetrical compound is prepared the reaction is carried out by reacting at least one molar equivalent of the appropriate first reactant (RYH) with the phosphorodichloridothionate, followed by reaction with at least a molar equivalent of the second reactant (R'Y'H). When Y or Y' is NH the reactant containing that group is added last to prevent formation of a P=N bond. The reaction may be carried out under various conditions depending upon the reactants. For example, temperatures may vary from about −10 to 150° C. The reaction may be completed in minutes or may take hours or even days. The reaction may be terminated at any point but is usually continued until analysis shows the phosphorodichloridothioate has been completely reacted. The halovinyl phosphorothionate product is then separated from the reaction mixture by conventional techniques such as solvent extraction, filtration, solvent removal and distillation to recover the purified product.

The following examples are illustrative of methods of preparing the compounds of the invention.

EXAMPLE I

O-(2,2-dichlorovinyl) phosphorodichloridothionate

A 411.9 gram (1.79 mole) sample of 2,2-dichlorovinyl phosphorodichloridate was added to 200 grams (0.9 mole) of phosphorus pentasulfide. A nitrogen atmosphere was maintained while the reaction mixture was heated for 5.5 hours in an oil bath at 165° C. The reaction mixture was a homogeneous deep burgundy viscous liquid. Methylene chloride (500 ml.) was then added to the reaction product causing a solid to separate. The solid was filtered to give 94.5 grams of a black powdery crystal containing some light colored amorphous solid dispersed through it. The filtrate was stripped in a rotating evaporator at 50–60° C. and 1.5 millimeters mercury pressure to remove solvent and light ends, which were discarded. The filtrate was then further stripped at 110° C. The light ends obtained from this second stripping amounted to 263.4 grams. This fraction was distilled through a 16" x 0.5" helix packed column with a variable reflux head. Product was collected at a reflux head temperature of from 39–43° C. and 0.02 millimeter pressure and amounted to 123.7 grams of 2,2-dichlorovinyl phosphorodichloridothionate; yield 29.3%. The composition of the product was determined by gas liquid chromatography and the structure of the product was confirmed by nuclear magnetic resonance (NMR) and infrared spectrum as well as by chemical analysis for the P→S bond.

*Elemental analysis.*—Calcd. for PSOCl$_4$C$_2$H (percent): S, 13.0; P, 12.6; Cl, 57.7. Found (percent): S, 13.0; P, 12.6; Cl, 57.8

EXAMPLE II

O-(2,2-dichlorovinyl) O,O-dimethyl phosphorothionate

A 12.95 gram (0.240 mole) portion of sodium methoxide was suspended in about 70 milliliters of tetrahydrofuran. The mixture was cooled to −5° C. and 30 grams (0.112 mole) of O-(2,2-dichlorovinyl) phosphorodichloridothioate was added. The reaction temperature was maintained at about −5 to 0° C. for two hours and at 32° C. for two more hours. Solvent was removed in a rotating evaporator. The residue was diluted with methylene chloride and a finely-divided salt was removed by filtration. The filtrate was stripped in a rotating evaporator at 40° C. at 0.5 millimeter of pressure to leave a residue of 26.4 grams.

This crude residue was further distilled in a falling film molecular still at 61° C. (0.02 millimeter pressure) to yield 11.4 grams of a distillate, 2.0 grams of residue, and 7.3 grams of light ends. The distillate and light ends were combined and redistilled through an 8" x ⅜" helix pack column and a variable reflux head to yield 12 grams of product (41.5%). The composition of the product was determined by gas liquid chromatography (GLC) and further identification of the product was made by NMR spectrum as well as by infrared analysis. Elemental analysis was made of the product containing O-(2,2-dichlorovinyl) O,O-dimethyl phosphorothionate and a minor amount of the starting material of O-(2,2-dichlorovinyl) phosphorodichloridothioate.

EXAMPLE III

O-(2,2-dichlorovinyl) O,O-diethyl phosphorothionate

To a suspension of sodium hydride (0.081 mole) in 35 ml. of ether cooled to −10° C. was added 10 grams (0.041 mole) of O-(2,2-dichlorovinyl) phosphorodichloridothioate. The temperature, which rose to −5° C., was dropped to −10° C. and 3.73 grams (0.081 mole) of anhydrous ethanol was added dropwise while maintaining a reaction temperature at −10 to 0° C. When addition was complete, the reaction mixture was heated to reflux 38° C. for one hour; essentially all of the O-(2,2-dichlorovinyl) phosphorodichloridothioate was consumed as indicated by GLC. The reaction mixture was diluted with 100 ml. of methylene chloride, washed with 350 ml. of water, and acidified by the addition of one drop of concentrated hydrochloric acid.

The methylene chloride fraction was dried with anhydrous magnesium sulfate and the solvents were removed in a rotating evaporator at 45° C. at 20 millimeters pressure to give 11.3 grams of pale yellow oil that was distilled through a short path head with a variable reflux control. The distillate was then chromatographed by passing through a 2" diameter nylon casing packed with 400 grams of deactivated silica gel. A 6.2 grams fraction was obtained which by GLC analysis was shown to be 98.2% pure O-(2,2-dichlorovinyl) O,O-diethyl phosphorothionate. The structure of the product was confirmed by elemental analysis and NMR spectrum. Calcd. for PSO$_3$Cl$_2$C$_6$H$_{11}$ (percent): P, 11.7; Cl, 26.8. Found (percent): P, 11.4; Cl, 26.8.

EXAMPLE IV

O-(2,2-dichlorovinyl) O-(2-methoxyethyl) O-methyl phosphorothionate

The reaction procedure followed in Example III was used with the exception that 0.041 mole each of methyl Cellosolve and methanol were added in the order mentioned. The crude product after stripping amounted to 9.7 grams. The product was identified by GLC analysis, elemental analysis and NMR.

*Elemental analysis.*—Calcd. for PSO$_4$Cl$_2$C$_6$H$_{11}$ (percent): P, 11.1; Cl, 25.3; S, 11.4. Found (percent): P, 11.0; Cl, 27.5; S, 12.1.

EXAMPLE V

O-(2,2-dichlorovinyl) O,O-dipropyl phosphorothionate

To a stirred anhydrous tetrahydrofuran (THF) solution of 25 grams (0.10 mole) of O-(2,2-dichlorovinyl) phosphorodichloridothioate containing 12 grams of 50% sodium hydride mineral oil suspension (6 grams, 0.25 mole NaH) at 5–10° C. was added dropwise 12.1 grams (0.20 mole) of n-propanol. After the initial exothermic reaction ceased, the reaction mixture was refluxed for 4 hours and stirred at ambient temperature for approximately 12 hours. Excess NaH was destroyed by addition of a water-THF mixture. The THF was stripped and the remaining aqueous mixture was extracted with methylene chloride. The methylene chloride extracts were washed with water, dried with anhydrous magnesium sulfate and stripped to give 35 grams of crude O-(2,2-dichlorovinyl) O,O-dipropyl phosphorothionate. Distillation through a wiped-film molecular still gave 27.8 grams of product. Structural identification was based on microanalyses and NMR spectrum.

EXAMPLE VI

O-(2,2-dichlorovinyl) O,O-dibutyl phosphorothionate

To a stirred anhydrous (methanol free) diglyme solution of 15.0 grams (0.06 mole) of O-(2,2-dichlorovinyl) phosphorodichloridothioate containing 5.85 grams of a 50% sodium hydride mineral oil suspension (2.9 grams, 0.12 mole NaH) at 5–10° C. was added dropwise 9.1 grams (0.12 mole) of n-butanol. The reaction mixture was stirred at ambient temperatures for 16 hours and poured into water. Extraction of the water with methylene chloride was followed by washing of the methylene chloride extracts with water, drying with anhydrous magnesium sulfate and stripping, to give 13.0 grams of liquid. Elution through a silica gel-G-column using methylene chloride as diluent gave 9.3 grams (48%) clear liquid, which was identified by NMR as O-(2,2-dichlorovinyl) O-butyl phosphorochloridothionate. This product was mixed with diglyme with one equivalent of butanol and one equivalent of sodium hydride and refluxed for three hours. Work up as described above, followed by repeated elution chromatography through silica gel-G using ethyl acetate, ethyl acetate-pentane (ratio 3:7) and finally distilled pentane as solvents afforded 5.1 grams of O - (2,2 - dichlorovinyl) O,O-dibutyl phosphorothionate characterized by microanalyses and NMR spectrum.

EXAMPLE VII

O-(2,2-dichlorovinyl) O,O-dipentyl phosphorothionate

This reaction was carried out by procedures described in Example V for the preparation of the dipropyl ester. A 78% yield of a light yellow product identified as O-(2,2-dichlorovinyl) O,O-dipentyl phosphorothionate was obtained.

EXAMPLE VIII

O-(2,2-dichlorovinyl) O,O-dioctyl phosphorothionate

To a stirred anhydrous tetrahydrofuran (THF) solution of 15 grams (0.06 mole) of O-(2,2-dichlorovinyl) phosphorodichloridothioate containing 8.0 grams of 50% sodium hydride mineral oil suspension (4.0 grams, 0.17 mole NaH) at 0–6° C. was added 7.9 grams (0.06 mole) of n-octanol. The reaction mixture was stirred at room temperature and monitored by the disappearance of the phosphorodichloridothioate. After ten days, the dichloridothioate was still present. An additional 7.9 grams (0.06 mole) of n-octanol and 8.0 grams 50% NaH mineral oil suspension was added and stirring was continued for 3 days at which time no phosphorodichloridothioate remained. Excess NaH was destroyed by dropwise addition of aqueous THF. This solution was extracted with methylene chloride and the extracts were washed with water, dried with magnesium sulfate, and stripped to give a dark liquid. This liquid was chromatographed through silica gel-G using hexane then ether as eluents to give a 19.1 gram Fraction A from the hexane eluent and a 4.1 gram Fraction B from the ether eluent. NMR spectra indicated Fraction A to be a mixture of octyl phosphate esters and Fraction B to contain approximately 50% n-octanol. Fraction B was discarded. Fraction A was chromatographed through silica gel-G with pentane as the eluent to give 10.8 grams of clear liquid (Fraction C) which was rechromatographed through silica gel-G using distilled pentane to give 1.6 grams of O-(2,2-dichlorovinyl) O,O-dioctyl phosphorothionate.

EXAMPLE IX

O-(2,2-dichlorovinyl) O,O-di-10-undecenyl phosphorothionate

To an ice-cooled THF suspension of 1.15 grams (0.05 mole) of sodium hydride prepared by hexane washing 2.3 grams of a 50% sodium hydride mineral oil suspension was added 12.3 grams (0.05 mole) of O-(2,2-dichlorovinyl) phosphorodichloridothioate. To this mixture was added dropwise 8.5 grams (0.05 mole) of 10-undecen-1-ol. After stirring at room temperature for 4 hours, GLC analysis indicated no reaction had occurred. The reaction was refluxed for 3 days and poured into water, and the aqueous solution was extracted with methylene chloride. The extracts were washed with water, dried with anhydrous magnesium sulfate and stripped to give 14.7 grams of a dark red liquid. The components in the liquid were separated by elution chromatography and one of the products was identified by NMR spectra to be O-(2,2-dichlorovinyl) O,O-di-10-undecenyl phosphorothionate.

EXAMPLE X

O-(2-chloro-2-fluorovinyl) O,O-dimethyl phosphorothionate

A mixture of 60 grams of O-(2-chloro-2-fluorovinyl) phosphorodichloridate and 22 grams of $P_2S_5$ was heated with stirring at 110–120° C. using an oil bath. After 2 hours the mixture was cooled and 2 volumes of pentane was added. The solution was decanted from a tarry insoluble residue and stripped and distilled under reduced pressure. A 24 gram fraction boiling at 75–82° C. (30 mm. pressure) containing O-(2-chloro-2-fluorovinyl) phosphorodichloridothioate was collected.

The O-(2-chloro-2-fluorovinyl) phosphorodichloridothioate containing fraction was added to 30 ml. of anhydrous methanol. An exothermic reaction began which heated the solution to boiling. The solution mixture was maintained at reflux for 1 hour and was then cooled, stripped and distilled. The fraction boiling at 62–66° C. (1.2 mm. pressure) was collected and by analysis found to contain O-(2-chloro-2-fluorovinyl) O,O-dimethylphosphorothionate.

EXAMPLE XI

O-(2,2-dichlorovinyl) S,S-diphenyl phosphorodithiolothionate

To a stirred anhydrous tetrahydrofuran (THF) solution of 15 grams (0.06 mole) of O-(2,2-dichlorovinyl) phosphorodichloridothioate containing 8.0 grams of 50% sodium hydride mineral oil suspension is added 13.2 grams (0.12 mole) of thiophenol. The reaction mixture is stirred at room temperature and monitored by the disappearance of the phosphorodichloridothioate after which excess sodium hydride is destroyed by dropwise addition of aqueous THF. The solution is then extracted with methylene chloride, water washed and dried with magnesium sulfate. The product obtained is stripped and distilled to yield O-(2,2-dichlorovinyl) S,S-diphenyl phosphorodithiolothionate.

EXAMPLE XII

O-(2,2-dichlorovinyl) N,N'-diethyl phosphorodiamidothionate

To a stirred anhydrous diglyme solution of 30.0 grams (0.12 mole) of O-(2,2-dichlorovinyl) phosphorodichloridothioate is added dropwise 21.6 grams (0.48 mole) of ethylamine. The reaction mixture is stirred until the disappearance of the phosphorodichloridothioate. The reaction mixture is then poured into water and washed. The product is extracted from the water by methylene chloride and dried with anhydrous magnesium sulfate. The product is then stripped and distilled to yield O-(2,2-dichlorovinyl) N,N'-diethyl phosphorodiamidothionate.

By following the procedure described above, the following compounds may also be prepared:

O-(2,2-dichlorovinyl) O-methyl O-ethyl phosphorothionate;
O-(2-chlorovinyl) O-methyl O-ethyl phosphorothionate;
O-(2,2-dichlorovinyl) O-methyl O-propyl phosphorothionate;
O-(2-chlorovinyl) O-methyl O-propyl phosphorothionate;
O-(2,2-dichlorovinyl) O-methyl O-isobutyl phosphorothionate;
O-(2-chlorovinyl) O-methyl O-isobutyl phosphorothionate;
O-(2,2-dichlorovinyl) O-methyl N-octyl phosphoramidothionate;
O-(2,2-dichlorovinyl) O-methyl O-octyl phosphorothionate;
O-(2,2-dichlorovinyl) O-ethyl O-pentyl phosphorothionate;
O-(2,2-dichlorovinyl) O-butyl S-butyl phosphorothiolothionate;
O-(2,2-dichlorovinyl) O-propyl O-decyl phosphorothionate;
O-(2,2-dichlorovinyl) O-allyl O-ethyl phosphorothionate;
O-(2,2-dichlorovinyl) O,O-bis(methoxyethyl) phosphorothionate;
O-(2,2-dichlorovinyl) O,O-diphenyl phosphorothionate;
O-(2-chlorovinyl) O,O-dibenzyl phosphorothioate;
O-(2,2-dibromovinyl) O,O-dipropy phosphorothioate;
O-(2,2-dichlorovinyl) S,S-dimethyl phosphorodithiolothionate;
O-(2,2-diiodovinyl) O-methyl O-phenyl phosphorothionate;

O-(2,2-dichlorovinyl) S-methyl S-octyl phosphorodithiolothionate;
O-(2,2-difluorovinyl) O-methyl S-methallyl phosphorothiolothionate;
O-(2,2-dichlorovinyl) N,N'-dimethyl phosphorodiamidothionate;
O-(2,2-dichlorovinyl) O-butyl N-butyl phosphoramidothionate;
O-(2,2-dichlorovinyl) S-methyl N-octyl phosphoromidothiolothionate;
O-(2-chlorovinyl) O,O-diethyl phosphorothionate;
O-(2,2-dichlorovinyl) O-methyl O-(2,4-dichlorophenyl) phosphorothionate;
O-(2-chlorovinyl) O-ethyl O-(3-nitrophenyl) phosphorothioate;
O-(2,2-dichlorovinyl) S-methyl S-butyl phosphorodithiolothionate;
O-(2,2-dichlorovinyl) N,N'-diphenyl phosphorodiamidothionate;
O-(2,2-dichlorovinyl) O-methyl O-benzyl phosphorothionate.

A group of 5 mice, parasitized by tapeworm (*Hymenolyis nana* "Hn") and pinworm (*Syphacia obvelata* "So") was treated by intubation with the single dose of the test compound, the dosage being near the maximum tolerated dose. The treated mice were kept from feed and water for 24 hours following treatment. Then the mice were sacrificed and the intestinal tracts were examined for the presence of parasites. If 60% or more of the mice were completely cleared of one and/or the other of the species of parasite, the test was replicated and if the results were confirmed, additional groups of parasitized mice were treated with successively lower dosages of the test compound to ascertain the minimum dosage required to clear 60% or more of the mice completely of one or the other of the two species of parasites. The same procedure was followed by treating rats, parasitized by roundworm (*Nippostrongylus braziliensis* "Nb"). The results for both mice and rats are reported in the following table.

TABLE I

Compound $$\begin{array}{c} R \\ \diagdown \\ O \\ \diagdown \\ P-OCH=CCl_2 \\ \diagup \\ O \\ \diagup \\ R' \end{array}$$

| | | | Mouse | | | Rat |
|---|---|---|---|---|---|---|
| | | | | M.E.D. | | | M.E.D. |
| R | R' | M.T.D. | Hn | So | M.T.D | Nb |
| CH$_3$ | CH$_3$ | 250 | 250 | 125 | 500 | 500 |
| C$_2$H$_5$ | C$_2$H$_5$ | 16 | >16 | >16 | 16 | >16 |
| C$_3$H$_7$ | C$_3$H$_7$ | 250 | >250 | >250 | 125 | 125 |
| C$_4$H$_9$ | C$_4$H$_9$ | 125 | >125 | >125 | 125 | >125 |
| C$_5$H$_{11}$ | C$_5$H$_{11}$ | 62 | >62 | >62 | 62 | >62 |
| C$_8$H$_{17}$ | C$_8$H$_{17}$ | 500 | >500 | 500 | 500 | >500 |
| CH$_3$ | CH$_3$OC$_2$H$_{40}$ | 31 | >31 | >31 | 31 | >31 |
| CH$_2$=CHC$_9$H$_{17}$ | CH$_2$=CHC$_9$H$_{18}$ | >125 | >125 | 125 | >125 | >125 |

The compounds of the present invention are useful in the field of insecticides and as anthelmintics in warm-blooded animals, particularly in ruminants.

The activity of the compounds of this invention with respect to helminth parasites in ruminants is indeed surprising in view of the fact that the anthelmintic activity in simple-stomached animals such as rats and mice is rather low. This is not to say, however, that the compounds of the present invention, in appropriate circumstances, and when formulated properly, cannot be used as anthelmintics in simple-stomached animals.

EXAMPLE XIII

The anthelmintic activity of the compounds representative of this invention in mice and rats is shown in this example.

Maximum tolerated dose.—The maximum tolerated dosage (M.T.D.) is defined as the milligrams of test compound per kilogram of animal body weight which does not cause death to the host animal. This was determined by dosing, by intubation, a group of mice with the dosage of 500 milligrams of test compound per kilogram of mouse body weight. If any of the mice died, further groups of mice were treated with successively smaller dosages of test compound until a dosage was found that all of the mice survived. This is recorded as the M.T.D.

The anthelmintic activity is reported as the minimum effective dosage (M.E.D.) which is milligrams of test compound per kilogram of body weight to effect a certain standard of clearance of parasites from the host animal. This was determined in any given case as follows.

EXAMPLE XIV

The anthelmintic activity in ruminants utilizing the compounds of this invention, is described in this example. The data were obtained using sheep as the ruminant unless otherwise indicated. The test compounds were administered as emulsifiable concentrates (EC), polyvinyl chloride resin pellets containing the active compound (PVC), or by mixing the active component in the feed (Feed). The compounds were administered at dosage levels indicated in the following table. Animals assigned to the control group were given similar quantities of blank formulation. Five animals were tested for efficiency with each compound unless otherwise indicated, and five animals were kept as a control group representative of the parasitic populations.

All animals were kept under the same conditions with no variation in their diets during the entire experimental period.

Two weeks after therapy, all animals were sacrificed and the abomasun and small intestinal contents were washed onto fine (No. 60) screens and the parasites were retained in 2% Formalin. The cecum and colon were inspected for parasites and all parasites were retained in 2% Formalin. The abomasun and small intestines were placed in artificial digest solution overnight and the contents were washed on fine screens and the parasites retained.

All parasites collected were identified and counted and the data were tabulated so as to show the degree of parasitic control the test compound showed compared to the control. The worms were classified as roundworms (Haemonchus Ostertagia, Trichostrongylus, Nematodirus and Oesophagostomum), whipworm (Trichuris), and hookworm. The data are presented in Table II.

TABLE II

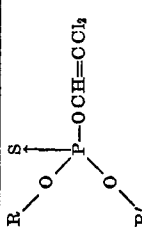

Average No. of worms recovered at necropsy (percent reduction from control)

| R | R' | Dosage, mg./kg. | Formulation | No. of animals | Haemonchus | Ostertagia | Tricho-strongylus | Nematodirus | Oesopha-gostomum | Hookworm | Cooperia | Trichuris | Total |
|---|---|---|---|---|---|---|---|---|---|---|---|---|---|
| Control | | | | 5 sheep | 3,345 | 284 | 2,400 | 1,120 | 3 | 0.2 | | 137 | 7,295 |
| CH₃ | CH₃ | 25 | EC | do | 1,468 (56) | 1,732 (0) | 2,193 (9) | 564 (50) | 1 (67) | 11 (0) | | 1 (99) | 5,973 (18) |
| CH₃ | CH₃ | 50 | EC | do | 1,112 (67) | 1,992 (0) | 3,484 (0) | 688 (39) | 0 (100) | 281 (0) | | 17 (88) | 7,882 (0) |
| CH₃ | CH₃ | 100 | EC | do | 360 (89) | 745 (0) | 3,860 (0) | 130 (88) | 4.2 (0) | 66 (0) | | 0 (100) | 4,169 (43) |
| CH₃ | CH₃ | 50 | PVC | do | 740 (78) | 1,000 (0) | 2,752 (0) | 364 (68) | 0 (100) | 0.2 (0) | | 0 (100) | 4,881 (33) |
| Control | | | | do | 400 | 2,076 | 6,020 | 1,816 | 0.8 | 16 | | 136 | 10,465 |
| C₂H₅ | C₂H₅ | 50 | EC | 3 sheep | 13 (97) | 280 (87) | 200 (97) | 27 (99) | 27 (0) | 8 (50) | | 136 (0) | 666 (94) |
| Control | | | | 4 sheep | 1,485 | 380 | 2,810 | 1,775 | 1 (0) | 1.5 | | 24 (75) | 6,477 |
| C₃H₇ | C₃H₇ | 50 | Feed | 5 sheep | 187 (87) | 447 (0) | 273 (90) | 0 (100) | 0.3 (67) | 0 (100) | | 6 (75) | 913 (86) |
| Control | | | | | 244 | 888 | 3,756 | 1,672 | 2 | 0 | | 11 | 6,582 |
| C₄H₉ | C₄H₉ | 25 | EC | do | 8 (97) | 128 (86) | 64 (98) | 108 (94) | 1 (50) | 5 (80) | | 25 (0) | 335 (95) |
| CH₃ | CH₃ | 50 | EC | 1 sheep¹ | 0 (100) | 0 (100) | 0 (100) | 0 (100) | 1 (50) | 0 (100) | | 0 (100) | 1 (100) |
| C₃H₇ | C₃H₇ | 50 | EC | do¹ | 0 (100) | 20 (98) | 20 (99) | 200 (88) | 1 (50) | 0 (100) | | 36 (0) | 277 (96) |
| C₃H₇ | C₃H₇ | 25 | EC | 5 sheep | 260 (0) | 576 (35) | 700 (81) | 292 (83) | 3 (0) | 5 (0) | | 45 (0) | 1,880 (71) |
| Control | | | | 5 calves | 0 | 5,124 | 13,460 | 0 | 38 | 7 | 1,944 | 72 (21) | 20,638 |
| C₄H₉ | C₄H₉ | 50 | Feed | do | 0 (—) | 47 (99) | 47 (99) | 0 (—) | 0 (100) | 7 (0) | 7 (99) | 57 | 157 (99) |

¹ 4 animals died of organophosphate intoxication.

As is evident from the above examples, the compounds of the present invention are surprisingly superior as anthelmintics for ruminants as compared with simple-stomached animals.

The compounds of this invention are employed as anthelmintics by the conventional means and techniques employed in the anthelmintic art. The manner in which these compounds are so used is described in detail in co-pending application Ser. No. 79,629 filed Oct. 9, 1970 which is drawn to the use of these compounds as anthelmintics. The dosage of the anthelmintic to be used will depend upon the particular kind or kinds of parasites to be controlled, the particular anthelmintic to be used, the kind of host animal, whether the anthelmintic is to be used to cure an already-existing infection or merely as a prophylactic and the like. These factors are those ordinarily encountered in the treatment of animals to cure and/or prevent their infestation by endoparasites. These factors and their solution are all well known to the practitioners of the art. In general, however, larger dosages are required to cure an already existing infestation than are required for prophylaxis. Thus, dosages of the anthelmintic to provide as little as one milligram of the anthelmintic per kilogram of live body weight of an animal fed at regular intervals, twice daily or daily, for example, may be sufficient to prevent infestation of animals by endoparasites. However, prophylactic dosages ordinarily will amount to about 2–10 milligrams of the anthelmintic per kilogram of animal body weight. The dosage required to eradicate already existing endoparasites ordinarily will be at least about 5 milligrams of the anthelmintic per kilogram of the animal body weight with usual dosages being about 5–50 milligrams on the same basis. The maximum dosage, of course, in every case, will be determined by the toxicity of the anthelmintic to the host animal.

Compounds of this invention are also useful as insecticides as indicated by the following example.

EXAMPLE XV

Insecticidal activity was determined by means of appropriate tests which established the LC₅₀ dosage (dosage in grams of test compound per 100 milliliters of solvent required in the solution or suspension used as a spray to kill 50% of the test insects) of compounds of the invention with respect to several species of insects. The results are in Table III.

TABLE III $$\begin{array}{c} R \\ \diagdown \\ O \quad S \\ \diagdown \uparrow \\ P-OCH=CCl_2 \\ \diagup \\ O \\ \diagup \\ R' \end{array}$$

| | | LC$_{50}$ Dosage for Indicated Insect | | | | | |
|---|---|---|---|---|---|---|---|
| R | R' | House fly | Pea aphid | Rice weevil | Common earworm | 2-spotted mite | Anopheles albimanuo mosquito |
| $CH_3$ | $CH_3$ | 0.011 | ᵃ0.1 | 0.017 | >0.2 | >0.2 | 0.033 |
| $C_2H_5$ | $C_2H_5$ | 0.013 | ᵃ0.1 | ᵃ0.015 | 0.01 | >0.2 | 0.015 |
| $C_5H_3$ | $CH_3OC_2H_5$— | 0.020 | 0.016 | 0.0029 | 0.039 | 0.077 | 0.003 |
| $C_3H_7$ | $C_3H_7$ | 0.032 | ᵃ0.1 | >0.1 | ᵃ0.2 | >0.2 | 0.013 |
| $C_4H_9$ | $C_4H_9$ | 0.195 | ᵃ0.1 | >0.1 | ᵃ0.2 | >0.2 | 0.068 |
| $C_5H_{11}$ | $C_5H_{11}$ | ᵃ0.6 | >0.1 | >0.1 | >0.2 | >0.2 | ᵃ0.18 |
| $C_8H_{17}$ | $C_8H_{17}$ | >1.0 | >0.1 | >0.1 | >0.2 | >0.2 | ᵇ>10 |

ᵃ Approximate.  ᵇ Parts per million.

The compounds of this invention, and in particular O-(2,2-dichlorovinyl) O,O-dimethyl phosphorothionate, are useful as vapor phase insecticides. The dimethyl ester just referred to has a surprisingly low degree of mammalian toxicity when compared to the corresponding oxygen analog, i.e., 2,2-dichlorovinyl dimethyl phosphate (DDVP). A comparison of the toxicities of these compounds is shown in Table IV.

EXAMPLE XVI

Activity against houseflies was tested by counting 100 houseflies into a spray cage. The spray cage was then sprayed with 0.6 ml. of test solution. The spray was made at various concentrations using 2–3 replicates for each concentration. After spraying, the flies were anesthetized with $CO_2$, transferred to a recovery cage and placed in a holding room for 18–20 hours after which mortality counts were made. The results were recorded by obtaining the LC$_{50}$, i.e., the concentration at which 50% of the flies were killed. At the same time, similar tests were conducted with respect to parathion at standard. The results are reported in terms of T.I. (toxicity index), which is the ratio of the LC$_{50}$ dosage for parathion to the LC$_{50}$ dosage for the test compound multiplied by 100. The mammalian toxicity for each of the compounds is also reported in terms of the LD$_{50}$, i.e., the lethal dose in terms of milligrams of test compound per kilogram of body weight required to kill 50% of the mice receiving an oral dosage of the test compound. The results are recorded in Table IV.

TABLE IV

| Compound | Housefly toxicity index | Mice LD$_{50}$ (mg./kg.) |
|---|---|---|
| $CH_3O$ \ ↑S / P—OCH=CCl$_2$ $CH_3O$ / | 36–48 | 934 |
| $CH_3O$ \ ↑O / P—SCH=CCl$_2$ $CH_3O$ / | 50 | 83 |
| $CH_3O$ \ ↑O / P—OCH=CCl$_2$ $CH_3O$ / | 79 | 162 |
| Parathion | 100 | ᵃ6–15 |

ᵃ Rats.

It is evident from Table IV that the compound used in this invention is not only active against insects, but also possesses a surprising degree of safety in the mammal, when compared to closely related analogs and homologs. While the degree of insecticidal activity is not as great as that of parathion or DDVP, its high tolerance in mammals as indicated by the LD$_{50}$ makes it highly attractive as an insecticide.

The compounds of this invention can be used for controlling insects and formulated as necessary for the purpose according to conventional practice, such as that set out in detail in U.S. Pat. 3,116,201. For example, a compound can be either sprayed or otherwise applied in the form of a solution or dispersion, or can be adsorbed on an inert finely-divided solid and applied as a dust. Useful solutions for application by spraying, brushing, dipping and the like, can be prepared by using as the solvent any of the well known inert horticultural carriers, including neutral hydrocarbons, such as kerosene and other light mineral oil distillates of intermediate viscosity and volatility.

Adjuvants such as spreading or wetting agents can also be included in the solution. Representative materials of this character are fatty acid soaps, rosin salts, saponins, gelatins, casein, long-chain fatty alcohols, long-chain alkyl sulfonates, phenol-ethylene oxide condensates, ammonium salts, and the like. These solutions may be employed as such, or more preferably, they can be dispersed or emulsified in water and the resulting aqueous dispersion or emulsion applied as a spray. Solid carrier materials which can be employed include talc, bentonite, lime, gypsum, and similar inert solid diluents. If desired, the compounds of the present invention can be employed as an aerosol as by dispersing the same into the atmosphere by means of a compressed gas.

Preferably, the compound is formulated in such a manner that volatilization may take place. This can be accomplished by means of any of the known vapor generators in use commercially. For example, the compound can be formulated in a thermoplastic matrix such as those disclosed in U.S. Pat. 3,318,769. Suitable resin matrixes include polyvinyl chlorides, polyvinyl acetals, such as polyvinyl butyral, and block-copolymer-PVC mixtures.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations as little as about 0.01–.5% based upon the total weight of the composition, even though under some circumstances as little as about 0.001% or as much as about 2% or even more of the compound can be employed with good results from an insecticidal standpoint. Concentrates suitable for sale for dilution in the field and/or ultra-low volume spray applications may contain as much as 25–50% by weight or even more of the insecticide. If employed in a thermoplastic matrix the concentration of the compound within the matrix can vary from about 5 to 75% of the matrix depending upon the particular thermoplastic involved.

When employed as an insecticide the compound of this invention can be used either as the sole toxic ingredient of the insecticidal composition or can be employed in conjunction with other insecticidally active materials. Representative insecticides of this class include the naturally occurring insecticides such as pyrethrum, rotenone, sabadilla, and the like, as well as the various synthetic insecticides including DDVP, benzenehexachloride, thiodiphenylamine, cyanides, tetraethyl pyrophosphate, diethyl p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

We claim as our invention:

1. A compound of the formula

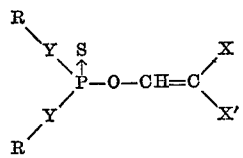

wherein R and R' are independently selected from the group consisting of alkyl, aryl, aralkyl, alkynyl, and alkoxyalkyl of up to 12 carbon atoms, Y and Y' are independently selected from the group consisting of O, S, NR and NH, X is a member selected from the group consisting of fluorine, chlorine, bromine and iodine and X' is a member selected from the group consisting of fluorine, chlorine, bromine, iodine and hydrogen.

2. A compound according to claim 1 wherein R and R' are alkyl, Y and Y' are O, X is chlorine and X' is chlorine or hydrogen.

3. A compound according to claim 2 wherein X' is hydrogen.

4. The compound according to claim 3 wherein R and R' are ethyl.

5. A compound according to claim 2 wherein R and R' are alkyl of 1 to 8 carbon atoms and X' is chlorine.

6. The compound according to claim 5 wherein R and R' are each methyl.

7. The compound according to claim 5 wherein R and R' are each n-butyl.

8. The compound according to claim 5 wherein R is methyl and R' is octyl.

9. The compound according to claim 5 wherein R and R' are each ethyl.

References Cited

UNITED STATES PATENTS

| | | | |
|---|---|---|---|
| 3,116,201 | 12/1963 | Whetstone | 260—957 X |
| 3,174,990 | 3/1965 | Ward et al. | 260—957 |

FOREIGN PATENTS

| | | | |
|---|---|---|---|
| 1,058,046 | 5/1959 | Germany | 260—957 |

OTHER REFERENCES

Golobbov et al., "Chem. Abst.," vol. 68 (1968), p. 11062.

LEWIS GOTTS, Primary Examiner

A. H. SUTTO, Assistant Examiner

U.S. Cl. X.R.

266—950, 973; 424—217, 219